US006888790B2

(12) United States Patent
Kilani

(10) Patent No.: US 6,888,790 B2
(45) Date of Patent: May 3, 2005

(54) FRAME SYNCHRONIZATION TECHNIQUE FOR OFDM BASED MODULATION SCHEME

(75) Inventor: Mehdi Tavassoli Kilani, West Lake Village, CA (US)

(73) Assignee: Maxim Integrated Products, Inc., Sunnyvale, CA (US)

(*) Notice: Subject to any disclaimer, the term of this patent is extended or adjusted under 35 U.S.C. 154(b) by 348 days.

(21) Appl. No.: 10/017,607

(22) Filed: Dec. 14, 2001

(65) Prior Publication Data
US 2002/0075797 A1 Jun. 20, 2002

Related U.S. Application Data

(60) Provisional application No. 60/255,844, filed on Dec. 15, 2000.

(51) Int. Cl.[7] .................................................. H04J 11/00
(52) U.S. Cl. ....................... 370/208; 370/335; 370/520; 375/355
(58) Field of Search ................................ 370/208, 207, 370/206, 203, 210, 335, 344, 342, 480, 520, 503, 320; 375/354, 355

(56) References Cited

U.S. PATENT DOCUMENTS 5,818,813 A * 10/1998 Saito et al. ................. 370/208
5,949,817 A    9/1999 Marshall
6,483,856 B1 * 11/2002 Bird ........................... 370/503

OTHER PUBLICATIONS van Nee, R., "A New OFDM Standard for High Rate Wireless LAN in the 5 GHZ Band," VTC 1999–Fall IEEE VTS 50th Vehicular Technology Conference, Gateway to the 21st Century.
Communications Village; Amsterdam, 9/19–22/99, IEEE Vehicular Technology Conference, New York, NY IEEE, US, vol. 1, Conf. 50, XP000929051; ISBN: 0–7803–5436–2.
ETSI: "Broadband Radio Access Networks (BRAN); HIP-ERLAN Type 2; Physical (PHY) layer," TS191475 V1.1.1, Apr. 1, 2000; SP002199125.
Chorng–Ren, S., et al.: "Joint symbol, frame, and carrier synchronization for Euraka 147 DAB system," 1997 IEEE 6th International Conference on Universal Personal Communications Record, San Diego, 10/12–16/97.
IEEE International Conference on Universal Personal Communications, New York, NY, IEEE, US, vol. 2, Conf. 6, XP010248797; ISBN: 0–7803–3777–8.

* cited by examiner

Primary Examiner—Chi Pham
Assistant Examiner—Alexander O. Boakye
(74) Attorney, Agent, or Firm—Blakely, Sokoloff, Taylor & Zafman LLP

(57) ABSTRACT

The present invention relates to the field of communications. The method includes generating a sequence of symbols, the sequence of symbols including preamble symbols and a data symbol. The method further includes receiving the sequence of symbols generated by the transmitter, the receiver including a frame synchronizer logic to perform frame synchronization.

12 Claims, 5 Drawing Sheets

FRAME SYNCHRONIZATION TECHNIQUE FOR OFDM BASED MODULATION SCHEME

RELATED APPLICATION

This application claims the benefit U.S. Provisional Patent Application No. 60/255,844 filed on Dec. 15, 2000.

FIELD OF THE INVENTION

The present invention relates to the field of communications. In particular, one embodiment of the invention relates to a circuit and method for reliably synchronizing a receiver with transmitted data symbols in an Orthogonal Frequency Division Multiplexing (OFDM) modulation scheme.

BRIEF DESCRIPTION OF THE DRAWINGS

The features and advantages of the present invention will become apparent from the following detailed description of the present invention in which.

DETAILED DESCRIPTION

Herein, the exemplary embodiments of the present invention relate to a technique and its implementation is proposed for the task of reliably synchronizing the receiver with the transmitted data symbols in an Orthogonal Frequency Division Multiplexing (OFDM) modulation scheme. In practice, there always exists some ambiguity regarding to the symbol number at which the symbol synchronization has been accomplished. This is due to the settling time required for automatic gain control (AGC) circuits as well as the inherent acquisition time of the symbol synchronizer itself. Therefore, frame synchronizer logic is useful to locate the beginning of the data symbols.

In the following description, certain terminology is used to describe certain features of the present invention. For example, "logic" includes hardware, firmware, software or a combination thereof that performs a certain function on input information. For example, logic may include, but is not limited or restricted to a processor (e.g., a digital signal processor, a microprocessor, a microcontroller, an application specific integrated circuit "ASIC" and the like). The term "information" is defined as voice, data, address, and/or control.

In addition, a "line" is generally defined as one or more physical or virtual information-carrying mediums to establish a communication pathway. Examples of the medium include a physical medium (e.g., electrical wire, optical fiber, cable, bus traces, etc.) or a wireless medium (e.g., air in combination with wireless signaling technology). In one embodiment, the line may be an Alternating Current (AC) power line, perhaps routing information in accordance with a HomePlug™ standard. The HomePlug™ standard is entitled "Medium Interface Specification Version 0.2" published on Sep. 11, 2000.

The term "symbol" is defined as the analog signal transmitted successively by the transmitter carrying control or information data. The symbols may be used for a variety of purposes. One example involves the use of symbols to synchronize information transmitted over different communication channels. Symbols may be embodied in a preamble of a message or within the data segment or block. The "preamble" is generally defined as an introductory portion of the message.

Figure 1A:
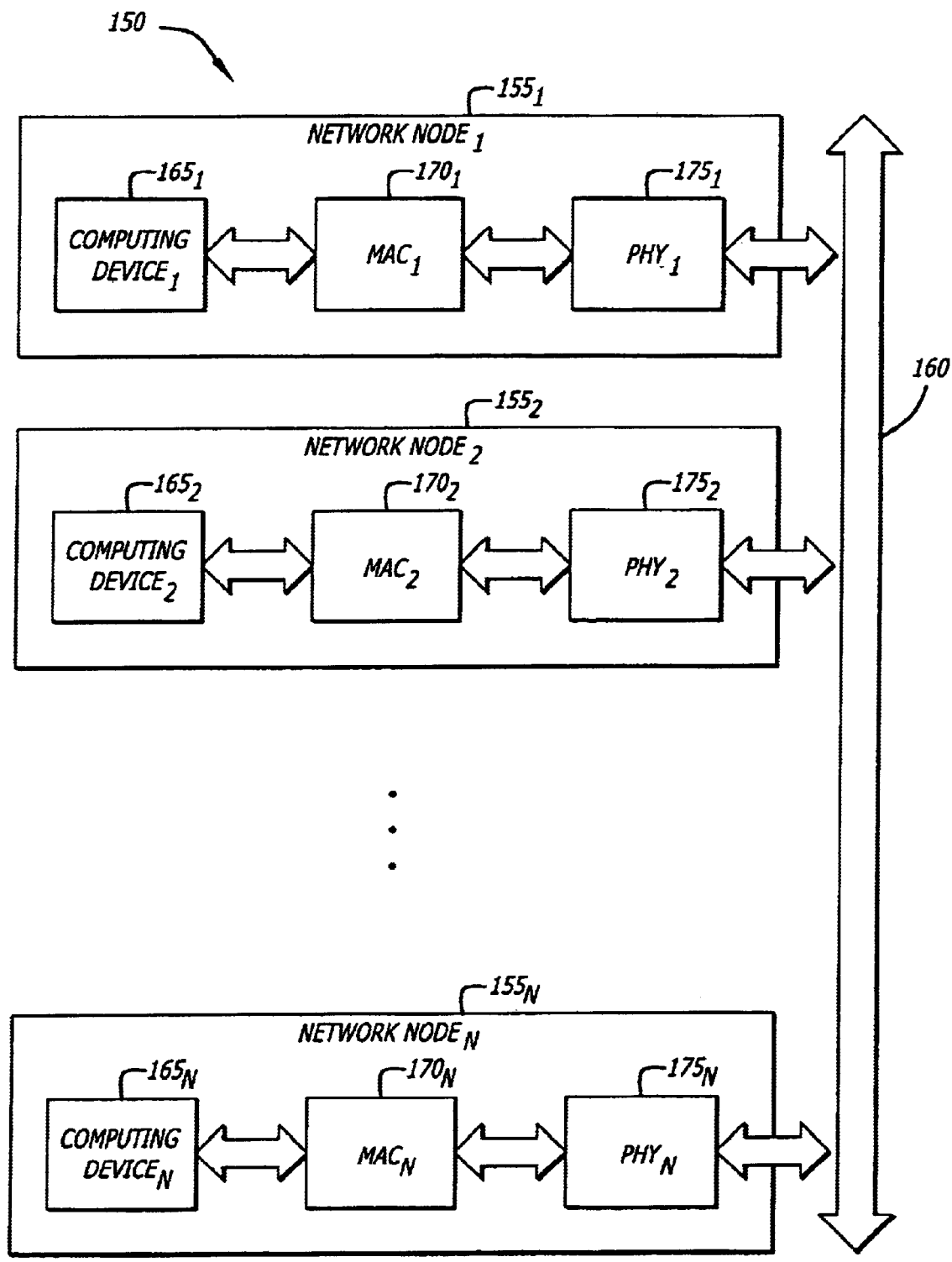
FIG. 1A is an exemplary network in accordance with one embodiment of the present invention.

Referring to FIG. 1A, an exemplary network 150 includes a plurality of network nodes $155_1, \ldots, 155_N$ (where N is a positive integer) coupled to a transmission medium 160. During a communication between at least two of the network nodes $155_1, \ldots, 155_N$ over the transmission medium 160, a first network node $155_1, \ldots, 155_N$ serves as the transmitting network node and at least one second network node $155_1, \ldots, 155_N$ serves as a receiving network node. Each network node $155_1, \ldots, 155_N$ includes a computing device $165_1, \ldots, 165_N$. Each network node $155_1, \ldots, 155_N$ further includes a media access control (MAC) unit $170_1, \ldots, 170_N$ operatively coupled to the computing device $155_1, \ldots, 155_N$, and a physical layer (PHY) unit $175_1, \ldots, 175_N$ operatively coupled to the MAC unit $170_1, \ldots, 170_N$.

In one embodiment, the MAC unit $170_1, \ldots, 170_N$ generally performs functions such as encapsulation/decapsulation, as well as media access management for transmit (Tx) and receive (Rx) functions. In this embodiment, the PHY unit $175_1, \ldots, 175_N$ can include a transmitter to perform Tx functions and a receiver to perform Rx functions.

Figure 1B:
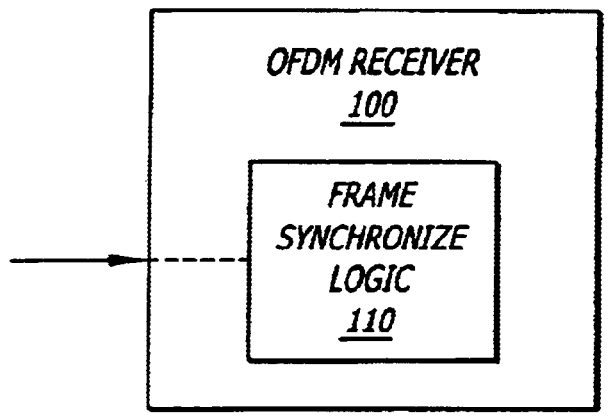
FIG. 1B is a block diagram of an exemplary Orthogonal Frequency Division Multiplexing (OFDM) Receiver in accordance with one embodiment of the present invention.

Referring to FIG. 1B, a block diagram of an exemplary Orthogonal Frequency Division Multiplexing (OFDM) receiver 100 is shown. In one embodiment, the OFDM receiver 100 can be included in the PHY unit $175_1, \ldots, 175_N$ (shown in FIG. 1A). In this embodiment, the OFDM receiver 100 comprises frame synchronizer logic 110 that detects a first data symbol in an OFDM based communication. In one embodiment, the frame synchronizer logic 110 generally performs frame synchronization at the end of the reception of the preamble.

In particular, the preamble waveforms are designed in such a way that the frame synchronization can be reliably achieved by configuring that all symbols in the preamble, with exception of a last symbol, have the same waveform. The main feature associated with the last symbol in the preamble is that the phase of each carrier has the maximum distance relative to corresponding sub-carrier in other preamble symbols. This abrupt change in the waveforms of the preamble symbols provides a suitable way to detect the last symbol. As a result, the start of the data symbol can be identified.

Figure 2:
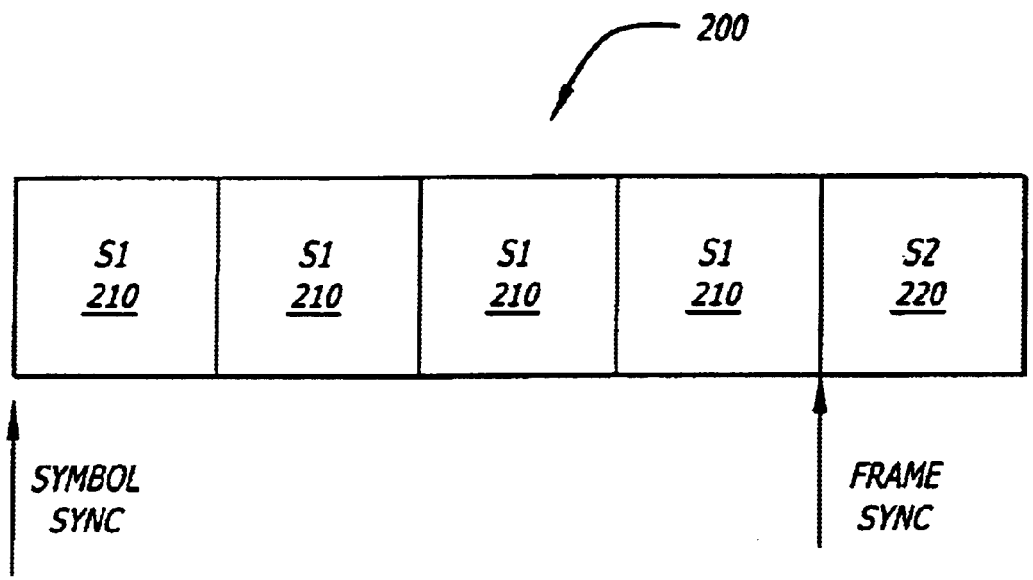
FIG. 2 is an exemplary embodiment of a data structure of a preamble waveform in accordance with OFDM format.
Figure 3:
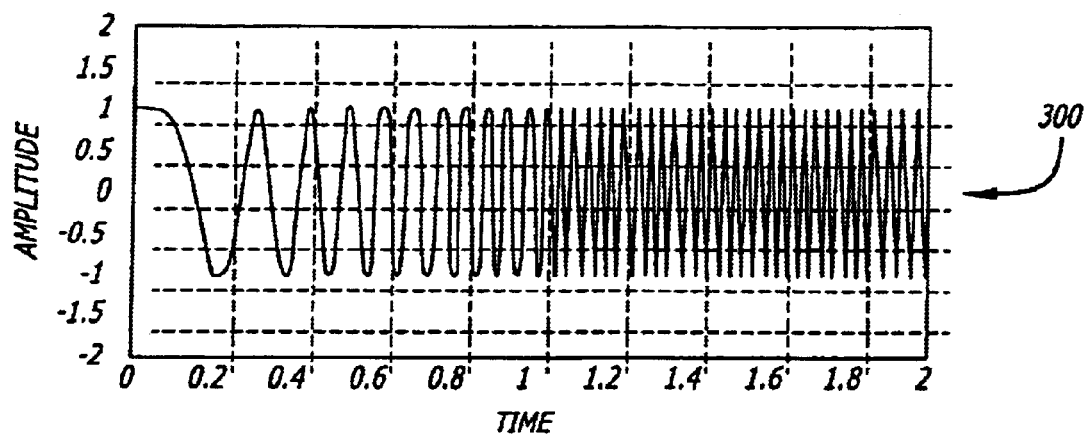
FIG. 3 is an exemplary embodiment of an original preamble symbol s1[n].

Referring now to FIG. 2, an exemplary structure of the preamble is shown. A preamble symbol 200, which is represented by "s1[n]" 210 can be a chirp signal whose frequency linearly or non-linearly changes with time. A typical waveform for the preamble symbol s1[n] is shown in FIG. 3. The data symbol "s2[n]" as shown in FIG. 4A can be obtained by taking a Fast Fourier Transform (FFT) of s1[n], conjugating the FFT coefficients, and taking an inverse FFT.

Figure 4A:
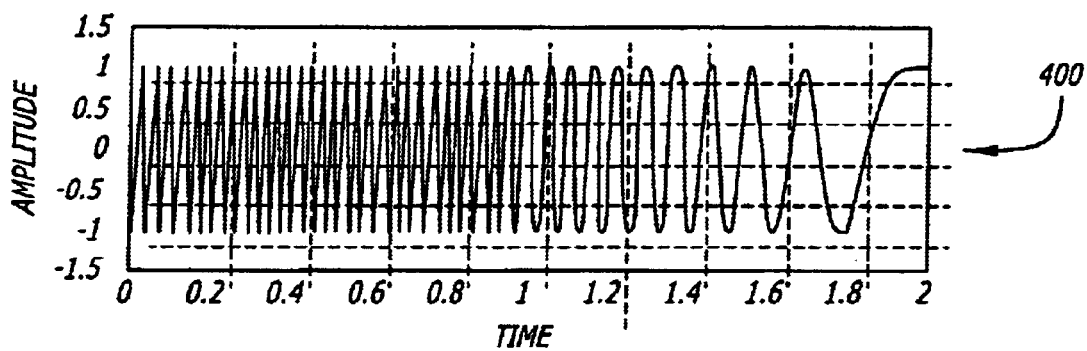
FIG. 4A is a first exemplary embodiment of a data symbol s2[n] based on the original preamble symbol s1[n] of FIG. 3.
Figure 4B:
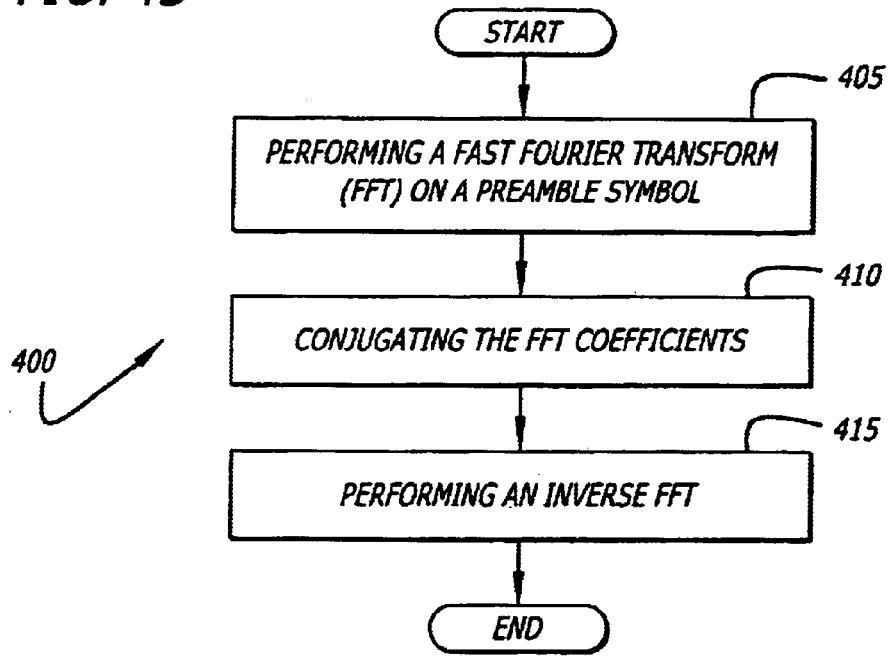
FIG. 4B, this figure outlines an exemplary process of obtaining the data symbol s2[n] (shown in FIG. 4A) in accordance with one embodiment of the present invention.

Turning to FIG. 4B, this figure outlines an exemplary process 400 of obtaining the data symbol s2[n] as shown in FIG. 4A. In block 405, a Fast Fourier Transform is performed on the waveform for the preamble symbol s1[n]. In block 410, the FFT coefficients are conjugated. In block 415, an inverse Fast Fourier Transform is performed to produce the waveform for the data symbol s2[n] as shown in FIG. 4A. The process 400 of FIG. 4B is generally equivalent to time reversing the original preamble symbol s1[n].

Figure 5:
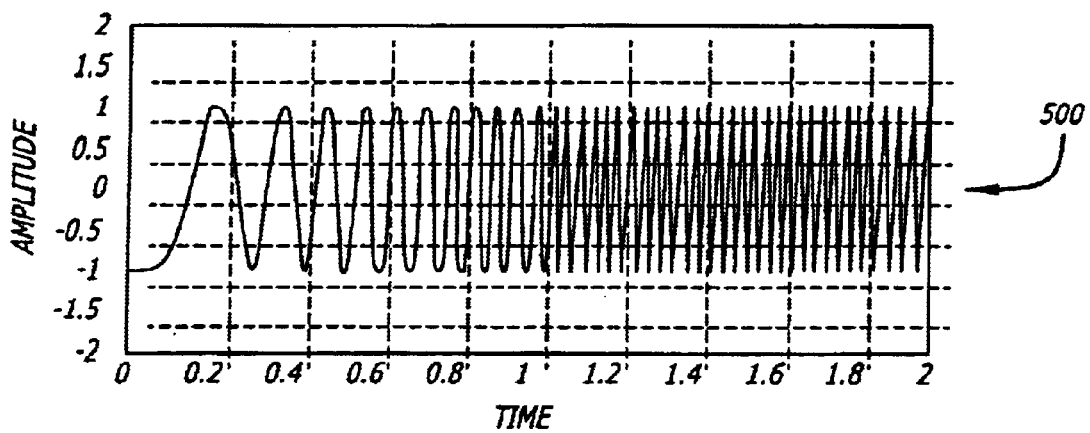
FIG. 5 is a second exemplary embodiment of a data symbol s2[n] in which a constant $\pi$ is added to the phase of each carrier.

Another approach to provide a significant distance in phase for s2[n] relative to s1[n] is to add the constant $\pi$ to the phase of each carrier. The resulting waveform for s2[n] is shown in FIG. 5. This phase shift will change the sign of the amplitude (amplitude reversing). In other words, the effect of the phase shift is equivalent to the multiplication of the original waveform by negative one (−1). It should be noted that both waveforms can be generated from the original source. It should be further noted that in situations where s1[n] represents pseudo random noise, the same method could be applied to design the waveform for s2[n].

Figure 6B:
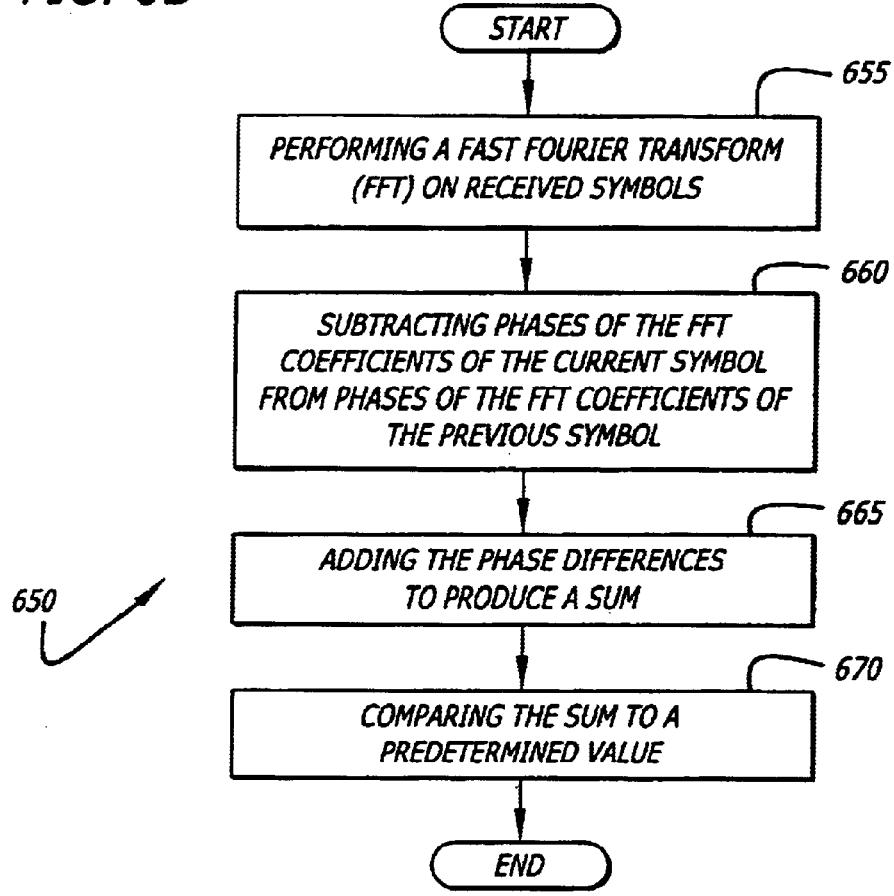
FIG. 6B outlines an exemplary process of recognizing the waveform for the data symbol s2[n] from s1[n] in accordance with one embodiment of the present invention.
Figure 6A:
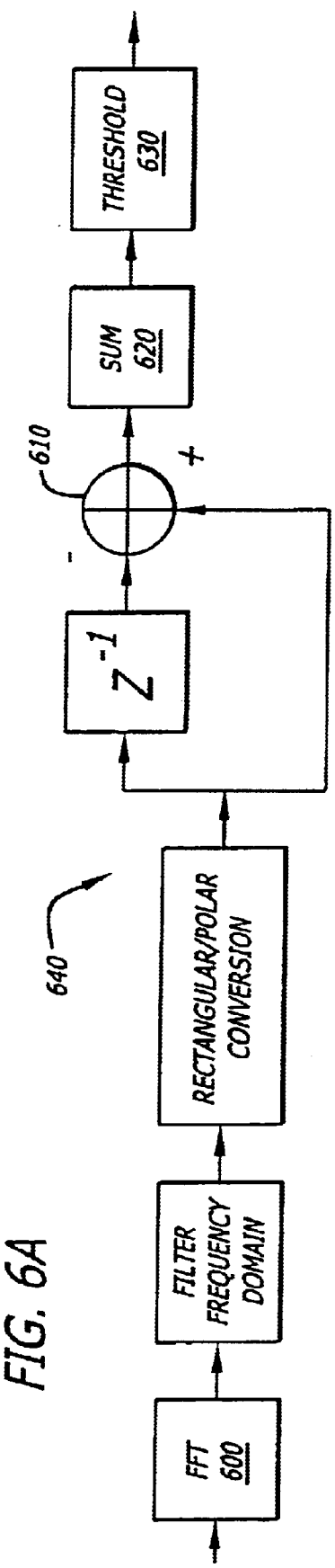
FIG. 6A shows a block diagram of an exemplary electronic circuitry in the frame synchronize logic of the exemplary OFDM receiver (shown in FIG. 1B) to implement an exemplary technique for recognizing the waveform for the data symbol s2[n] from s1[n].

Referring now to FIG. 6A, this figure shows a block diagram of an exemplary electronic circuitry 640 in the frame synchronize logic 110 of the exemplary OFDM receiver 100 (shown in FIG. 1B) to implement an exemplary technique for recognizing the waveform for the data symbol s2[n] from s1[n]. The exemplary technique is generally based on recognition of the phase differences between adjacent symbols. FFT unit 600 is used to perform a Fast Fourier Transform on received symbols. The phases of the FFT coefficients of the current symbol are subtracted from the phases of the FFT coefficients of the previous symbol. Adder 610 is used to add the phase differences of all carriers to produce a sum 620. Threshold comparator 630 is then used to compare the sum 620 against a predetermined value. If the sum 620 is above the predetermined value, the end of preamble and the start of data symbol can be recognized.

Turning to FIG. 6B, this figure outlines an exemplary process 650 of recognizing the waveform for the data symbol s2[n] from s1[n]. In block 655, a Fast Fourier Transformation is performed on received symbols. In block 660, phases of the FFT coefficients of the current symbol are subtracted from the FFT coefficients of the previous symbol. In block 665, the phase differences computed in block 660 are added to produce a sum. The sum is then compared against a predetermined value (block 670). If the sum is above a predetermined value, the end of the preamble and the start of data symbol can be recognized.

Figure 7:
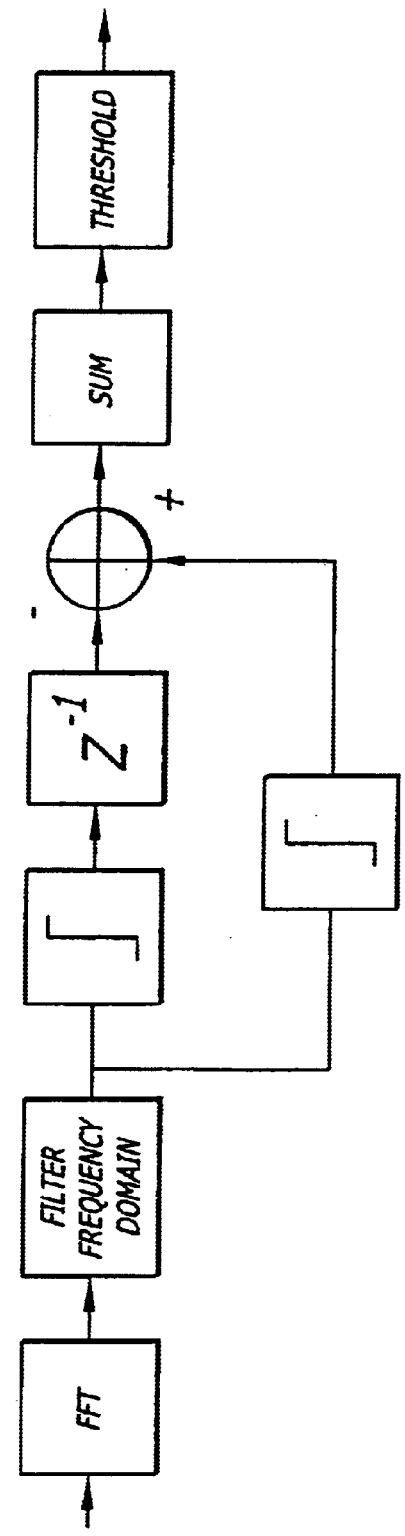
FIG. 7 shows a block diagram of an exemplary electronic circuit in the frame synchronize logic of the exemplary OFDM receiver (shown in FIG. 1B) to implement an alternative technique for recognizing the waveform for the data symbol s2[n] from s1[n] based on phase differences between adjacent symbols.

It should be noted that the phase computation could be avoided by performing the subtraction directly on the FFT coefficients and by accepting some degradation in performance. Further simplification of the block diagram of FIG. 6A can also be obtained by just considering the sign of the FFT coefficients. The simplified block diagram is shown in FIG. 7.

An advantage of comparing the waveforms in frequency domain is that, an optimum filtering can be applied to enhance the performance of the frame synchronization. In OFDM based receivers, the FFT engine is already implemented for demodulation and channel estimation purposes. This means that the FFT coefficients of the preamble signal are already available. In practice, the preamble signal can be decomposed to its sinusoidal components; therefore filtering can be easily applied by taking into account just those components that carry preamble information. This provides a suitable means to implement the filtering in frequency domain at no extra cost.

Another advantage of the proposed approach is that, in channels with severe fading, the SNRs associated with some of the carriers located in the faded part of the spectrum become dramatically low. Those faded carrier can be identified during the channel estimation and therefore can be excluded when the symbol comparison is performed in frequency domain. In another approach, the preamble waveform for the next packet can be adaptively constructed by removing those faded carries to further enhance the performance of frame synchronization.

It should be noted that functional components, as shown in the figures and described above in the text accompanying the figures, could be implemented using software code segments. If the aforementioned functional components are implemented using software code segments, these code segments can be stored on a machine-readable medium, such as floppy disk, hard drive, CD-ROM, DVD, tape, memory, or any storage device that is accessible by a computing machine.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, it is possible to implement the present invention or some of its features in hardware, firmware, software or a combination thereof where the software is provided in a processor readable storage medium such as a magnetic, optical, or semiconductor storage medium.

What is claimed is:

1. A system comprising:
   a transmitter in a first network node to generate a sequence of symbols, the sequence of including preamble symbols and a data symbol, a last preamble symbol in the sequence of symbols having a different waveform than other preamble symbols in the sequence of symbols; and
   a receiver in a second network node to receive the sequence of symbols generated by the transmitter, the receiver including a frame synchronizer logic to perform frame synchronization.

2. A system comprising:
   a transmitter in a first network node to generate a sequence of symbols, the sequence of including preamble symbols and a data symbol, a waveform of a last preamble symbol in the sequence of symbols is different than waveforms of other preamble symbols in the sequence of symbols; and
   a receiver in a second network node to receive the sequence of symbols generated by the transmitter, the receiver including a frame synchronizer logic to perform frame synchronization.

3. The system of claim 2, wherein the difference between the waveform of the last preamble and the waveforms of other preamble symbols provide a way for the frame synchronizer logic to detect the last preamble symbol.

4. The system of claim 2, wherein the last preamble symbol immediately precedes the data symbol and the frame synchronizer logic detects the data symbol by detecting the last preamble symbol.

5. The system of claim 2, wherein the frame synchronizer logic obtains the data symbol by taking a Fast Fourier Transform (FFT) of the preamble symbols, conjugating FFT coefficients, and taking an inverse FFT.

6. The system of claim 2, wherein the frame synchronizer logic obtains the data symbol by adding a constant to each carrier phase of the preamble symbols.

7. A method comprising:
generating a sequence of symbols, the sequence of symbols including preamble symbols and data symbol;
using a second waveform to represent a last preamble symbol in the sequence of symbols and a first waveform to represent other preamble symbols in the sequence of symbols, wherein the second waveform is substantially different than the first waveform; and
receiving the sequence of symbols generated by the transmitter, the receiver including a frame synchronizer logic to perform frame synchronization.

8. The method of claim 7, further comprising:
detecting the last preamble symbol in the sequence of symbols by recognizing the substantial difference between the second waveform and the first waveform.

9. The method of claim 7, further comprising placing the last preamble immediately before the data symbol.

10. The method of claim 7, further comprising detecting the data symbol by recognizing the last preamble symbol.

11. The method of claim 7, further comprising obtaining the data symbol by adding a constant to each carrier phase of the preamble symbols.

12. A machine-readable medium comprising instructions which, when executed by a machine, cause the machine to perform operations comprising:
generating a sequence of symbols, the sequence of symbols including preamble symbols and a data symbol, a last preamble symbol in the sequence of symbols having a different waveform than other preamble symbols in the sequence of symbols; and
receiving the sequence of symbols generated by the transmitter, the receiver including a frame synchronizer logic to perform frame synchronization.

* * * * *